United States Patent [19]

Adams, Jr. et al.

[11] Patent Number: 5,395,806
[45] Date of Patent: Mar. 7, 1995

[54] DENSE, GRANULAR ALKALINE EARTH METAL CARBONATE AND ALKALI METAL SALT COMPOSITION FOR USE IN GLASS MANUFACTURE

[75] Inventors: Charles Adams, Jr.; Jerry A. Cook, both of Cartersville, Ga.

[73] Assignee: Chemical Products Corporation, Cartersville, Ga.

[21] Appl. No.: 127,873

[22] Filed: Aug. 28, 1993

[51] Int. Cl.6 .......................... C09C 1/02; C01F 11/18
[52] U.S. Cl. .............................. 501/27; 23/293 R; 423/430; 423/421; 423/420.2; 106/463; 106/464
[58] Field of Search .............. 501/27; 23/293 R; 423/430, 421, 420.2; 106/463, 464

[56] References Cited

U.S. PATENT DOCUMENTS

| | | | |
|---|---|---|---|
| 3,615,811 | 10/1971 | Barrett et al. | 106/306 |
| 3,802,901 | 4/1974 | Robertson et al. | 106/463 |
| 4,888,161 | 12/1989 | Adams, Jr. et al. | 501/27 |

*Primary Examiner*—Karl Group
*Assistant Examiner*—C. M. Bonner

[57] ABSTRACT

A novel alkaline earth metal carbonate product for use as a raw material in the glass manufacturing process is disclosed. The alkaline earth metal carbonate becomes a part of the liquid phase in the glass furnace more readily and at a lower temperature; it decomposes to release carbon dioxide gas more rapidly so that all of the gas can escape from the molten glass more easily. Using these alkaline earth metal carbonate compositions, the production capacity of a glass furnace is increased.

20 Claims, No Drawings

DENSE, GRANULAR ALKALINE EARTH METAL CARBONATE AND ALKALI METAL SALT COMPOSITION FOR USE IN GLASS MANUFACTURE

BACKGROUND

Using the granular product of this invention, the alkaline earth metal carbonate raw materials in the glass batch react more readily thereby increasing the production capacity of the glass furnace.

Alkaline earth metal carbonates, as well as alkali metal carbonates, are ingredients in some glass formulations. In the production of the face plates for color television sets, strontium carbonate and barium carbonate constitute a sizeable portion of the glass furnace feed. Strontium carbonate makes up about 15% of the weight of the glass furnace feed for color TV faceplate glass; barium carbonate is usually present in equal or lesser amounts. These strontium and barium ions function in the glass as X-ray absorbers. Lesser amounts of calcium carbonate and magnesium carbonate are usually added to the glass furnace feed also. The face plates of black-and-white televisions contain barium carbonate as the primary X-ray absorber.

In the predominant commercial production method for strontium carbonate or barium carbonate, naturally occurring strontium sulfate (celestite) or barium sulfate (barite) is reduced to strontium sulfide or barium sulfide; these are water soluble. The sulfide is dissolved in water, insoluble impurities are removed by filtration, and either sodium carbonate solution or carbon dioxide gas is introduced into the solution to precipitate substantially pure crystals of insoluble strontium carbonate or barium carbonate. These very small crystals yield fluffy, low bulk density powders which are not free flowing.

Another production method for strontium carbonate entails reacting the naturally occurring strontium sulfate with sodium carbonate in aqueous solution to form sodium sulfate and strontium carbonate. The sodium sulfate has a much higher solubility in water than strontium carbonate, so filtration and washing will yield a solid strontium carbonate essentially free of sodium sulfate. Once again, this method yields a fine, fluffy, low bulk density powder which is not free flowing.

Calcium carbonate and magnesium carbonate for use as feed-stock for glass manufacture are usually produced by crushing and grinding naturally occurring mineral of the required purity to the required particle size (smaller than about 1 millimeter). They, like barium carbonate and strontium carbonate, are essentially insoluble in water.

Strontium carbonate and barium carbonate products suited for feedstock for glass manufacture have previously been produced primarily by heating the small crystals to a temperature of about 800° C. for sufficient time to allow sintering of the crystals to occur. This process yields a dense, coarse granular material that must be ground to a particle size acceptable to the glass manufacturer (below about 1 millimeter particle size). Impurities derived from the heat treatment process, usually refractory brick pieces and/or iron scale, contaminate sintered products and are detrimental to glass furnace performance. U.S. Pat. Nos. 3,802,901 and 3,883,364 (Robertson et al.) describe an improvement to the sintering process entailing the admixture of an aqueous sodium silicate solution with the small crystals to place up to 0.50 percent by weight of silicate (expressed as silicon dioxide) in the mixture, based on the dry weight of the alkaline earth metal carbonate to allow sintering to proceed more readily.

Spray drying to form spherical particles of a size suitable for a glass furnace feedstock as well as briquetting of the strontium carbonate or barium carbonate powder under high pressure followed by crushing have been employed to produce glass-grade products (with particle size below about 1 millimeter and above about 0.1 millimeter). U.S. Pat. Nos. 4,88,161 and 4,888,308 (Adams, Jr. et al.) teach that fully dispersed, spray dried spheres can be heat treated to a temperature below the sintering temperature to increase their bulk density and thus make them more acceptable for glass furnace feedstock.

In the manufacture of glass objects, glass raw materials such as sand, soda ash (sodium carbonate), potash (potassium carbonate), lime (calcium carbonate), barium carbonate, and strontium carbonate are usually accurately weighed into a batch mixer, intimately admixed to form the "glass batch", then introduced into a continuous tank furnace in which the fuel (usually natural gas) is burned inside the tank itself in tremendous flames that shoot out over the top of a pool of molten glass and unmelted or undissolved raw materials. The raw material feed components should be granular to prevent their being blown out of the glass furnace. At some temperature and after some length of time the carbonates react with the silica sand liberating carbon dioxide gas (if nitrates are added to the glass batch, oxides of nitrogen will also be liberated). The gas bubbles escape and a homogeneous melt is achieved if the molten glass is held in the glass furnace for a sufficiently long time. The molten glass is then allowed to pour from the furnace and it is formed into the desired shape.

In producing television face plates, quality is critical. If the slightest imperfection, such as an undissolved particle, a tiny gas bubble, or a "cold glass defect" caused by inhomogenity or incomplete melting is detected, the face plate must be broken and remelted in the glass furnace. The capacity of any particular glass furnace producing television face plate glass is determined by the ease of melting of the glass raw materials and/or the percentage of the glass product which is flawed and must be fed back to the furnace for remelting. Sources of alkali metal ions which are more expensive than sodium carbonate and potassium carbonate are sometimes used in limited quantities to promote the melting of the glass batch. A glass batch composed of granular raw materials which will react together rapidly upon heating to form a homogeneous glass free of defects greatly improves the economics of glass manufacture.

Glass-making involves a series of poorly understood and complex steps involving melting, dissolution, decomposition, and chemical reaction. A simplistic model of the process, occurring between granules of sand, alkali metal carbonates, and alkaline earth metal carbonates, would involve:

1. The lowest melting components becoming liquids:
    sodium carbonate melts at 854° C.
    potassium carbonate melts at 901° C.
2. The liquid phase coating the surfaces of the granules of higher melting components: sand [M.P. 1601° C.], calcium carbonate [M.P. about 1300° C.], strontium carbonate [M.P. about 1200° C.], barium carbonate [M.P. about 1300° C.], and broken recycled glass [M.P. about 1050° C.];
3. Some of the liquid phase possibly draining down to the bottom of the raw material bed creating inhomogeneity;
4. The liquid reacting with the surface of the sand grains $$Na_2CO_3 + SiO_2 \rightarrow Na_2SiO_3 + CO_2 \text{ (gas)}$$

$$K_2CO_3 + SiO_2 \rightarrow K_2SiO_3 + CO_2 \text{ (gas)}$$

and the alkaline earth metal carbonate granules beginning to dissolve in the liquid.
5. The alkaline earth metal carbonates eventually melting or dissolving to become a part of the liquid phase, then reacting with the surface of the sand grains $$SrCO_3 + SiO_2 \rightarrow SrSiO_3 + CO_2 \text{(gas)}$$

$$BaCO_3 + SiO_2 \rightarrow BaSiO_3 + CO_2 \text{(gas)}$$

6. The liquid continuing to react with the sand (for example, $Na_2SiO_3 + SiO_2 \rightarrow Na_2Si_2O_5$) and the gas bubbles in the liquid slowly rising to be released at the surface of the molten glass.
7. Diffusion and convection currents within the liquid resulting in a homogeneous glass composition after all solids have melted and/or reacted.

All of this occurs while the temperature within the glass furnace is raised to about 1300° C. The raw materials introduced to the glass furnace are in the form of particles averaging about 0.5 millimeter in diameter with none larger than about 1 millimeter. This particle size promotes ease of materials handling (free flowing grains), intimate admixing of the glass batch ingredients, and minimizes dust generation.

To address the problem of alkali metal salts such as sodium and potassium carbonate melting at relatively low temperatures and draining away from the other ingredients in a glass batch causing inhomogeneity in the glass furnace, U.S. Pat. 3,817,776 (Gringras, "Granular Free-Flowing Material for Use in the Manufacture of Glass") teaches the spraying of sodium hydroxide solution onto sand grains then heating to 320° C. to 450° C. to allow reaction of the caustic with the surface of the sand. This reaction transforms the sodium hydroxide into sodium metasilicate (melting point 1088° C.) according to the patent.

SUMMARY OF THE INVENTION

We have discovered that a dense, granular free-flowing material suitable for glass furnace feedstock can be prepared by
a) forming an admixture of fine alkaline earth metal carbonate particles (preferably smaller than about 0.04 millimeter diameter) and water sufficient to at least form a damp mass;
b) adding to the admixture a water-soluble alkali metal salt at the rate of at least 0.2 atomic weights of alkali metal for each molecular weight of alkaline earth metal carbonate, and preferably from about 1 to about 3 atomic weights of alkali metal for each molecular weight of alkaline earth metal carbonate. The alkali metal compound should exhibit substantial solubility in water and the anion present with the alkali metal cation should be one that is not detrimental in a glass batch; examples are the carbonate, hydroxide, nitrate, silicate, acetate, and, depending on the specific glass formulation, possibly borate.
c) mixing the admixture of alkaline earth metal carbonate, water, and alkali metal salt for sufficient time to allow at least a portion of the alkali metal salt to dissolve in the aqueous phase and to achieve homogeneity;
d) drying and, if necessary, crushing the dried product to yield granules that are of a size acceptable for glass manufacture, usually about 1 millimeter or less in diameter.

The resulting product is composed of granules that are hard enough to be free-flowing and non-dusty. It has an acceptable bulk density for the glass industry (greater than about 65 pounds per cubic foot). The above described process yields a product which, when introduced to the glass furnace as part of a glass batch, allows the alkaline earth metal carbonate to become a part of the liquid phase in the furnace more rapidly and to thus be more reactive. This can be demonstrated by measuring the rate of carbon dioxide release from a glass batch—the carbon dioxide is released at a lower temperature and more rapidly when the product of the present invention is employed.

The amount of water admixed with the alkaline earth metal carbonate and alkali metal salt is not critical as long as it is sufficient to allow at least a portion of the alkali metal salt to dissolve—that is, at least about 5 percent of the total weight of the admixture and preferably at least about 10 percent of the total weight of the admixture. The temperature reached by the granular product during drying is not critical as long as it is at least about 110° C.

We have found that the fine, fluffy powders of strontium and barium carbonate produced as herein described are made up of many individual crystals packed together in a loose "brush heap" configuration. Sintering allows these tiny crystals to grow into a few much larger, densely-packed crystals which are relatively unreactive in the glass furnace during the initial stages of melting and dissolution. The present invention relies upon alkali metal salts to alter the packing density of the alkaline earth metal carbonate particles, fill the voids within the "brush heaps", and to bond them together. The crystallization/recrystallization kinetics of the alkali metal salt on the surface of the insoluble alkaline earth metal carbonate are not understood, but surprisingly a dense, hard granular material results.

Without limiting the scope of the present invention by theory, it appears that when the product of the present invention is heated in a glass furnace, the alkali metal salt melts, is held in place by capillary forces within the granule, and acts over the large contact surface area to dissolve the alkaline earth metal carbonate much more rapidly than when prior art products are heated. When barium carbonate and strontium carbonate products of the present invention are prepared utilizing sodium and potassium carbonates, the granules become liquid much more readily than granules of prior art glass-grade barium carbonate and strontium carbonate and the decomposition of the alkaline earth metal carbonates to their oxides proceeds at a lower temperature. This improves gas release from the glass and enhances the reactivity with silica.

Using the product of the present invention, the alkaline earth metal carbonates in the glass batch become a part of the liquid phase more rapidly and react with the silica more rapidly. Both undissolved particles (called "stones") and gas bubbles which were liberated too late to escape from the glass (called "seeds") are reduced in the glass leaving the glass furnace. An additional benefit is seen from reducing the inhomogeneity which results from alkali metal salts melting and draining away from the other glass batch ingredients. A further benefit of the product of the present invention over the sintered alkaline earth metal carbonate products is that the contaminants resulting from the high temperature sintering process (pieces of the lining from refractory-brick-lined process equipment and iron scale) are absent; these contaminants can be difficult to melt in the glass furnace and may result in "stones" in the glass.

Alkali metal salts of organic anions can be added as a portion of the alkali metal salts in the product of the present invention. Organic compounds which affect the crystallization of inorganic salts or their precipitation from solution may have a beneficial effect in forming the product of the present invention depending upon the specific alkali metal salts employed and the amount of water present when the alkali metal salt is admixed with the alkaline earth metal carbonate.

To enhance even further one of the benefits of the product of the present invention, other minor ingredients in the furnace glass batch (such as litharge, titanium dioxide, or cerium oxide) may be admixed into the product of the present invention to further insure that the glass batch melts to a homogeneous glass as readily as possible.

Even though significant quantities of a lower specific gravity compound are added (the specific gravity of sodium carbonate and potassium carbonate are 2.53 and 2.43, respectively compared to 3.70 and 4.43 for strontium carbonate and barium carbonate, respectively), the resulting mixture dries to form dense granules. Bulk densities in the range of about 65 to 100 pounds per cubic foot are achieved for granules most of which are smaller than 14 Tyler screen mesh (1.168 mm) and larger than 150 Tyler screen mesh (0.104 mm).

The invention is further illustrated by the following examples:

EXAMPLE I (Preparation of Granular Strontium Carbonate)

Freshly precipitated strontium carbonate crystals are dewatered in a continuous pressure filter to yield a 67 weight percent strontium carbonate filter cake (33 weight percent water) having the consistency of a crumbly, semi-hard clay. (If this flocculated filter cake is dried at 110° C. and pulverized, the bulk density of the dry strontium carbonate is 37 lb./ft.$^3$). The wet filter cake is continuously introduced into a 10 HP, 4 gallon capacity Kneadermaster mixer, manufactured by Patterson Corp., Toccoa, Ga., at the rate of 8 pounds of filter cake per minute. Dry potassium carbonate (with a tapped bulk density of 71 #per foot cubed) is added to the mixer at the rate of 2 pounds per minute (this is 0.4 molecular weights of potassium carbonate which is 0.8 atomic weights of potassium for each molecular weight of strontium carbonate). A homogeneous material with the consistency of toothpaste is discharged from the mixer onto a stainless steel belt which conveys the material through a heated drying zone where the material is heated to 200° C. The dried cake is crushed and screened to yield hard granules which will pass through a 14 mesh Tyler screen (1.168 millimeter openings). The granular product has a tapped bulk density of 80 pounds per cubic foot.

EXAMPLE II (Preparation of Granular Mixed Barium and Strontium Carbonate)

A particular glass formulation for color television face plates contains, among other ingredients, strontium carbonate, barium carbonate, and potassium carbonate in the proportions 5:1:4 respectively. A granular product will be prepared which can be weighed into the glass batch to satisfy the requirements for all these ingredients.

The 67 weight percent strontium carbonate filter cake (33 weight percent water) of Example I is blended in the Kneadermaster mixer with dried, pulverized barium carbonate filter cake and dry potassium carbonate in the following proportions:

7.46 pounds strontium carbonate filter cake
1.00 pound dry barium carbonate
4.00 pounds dry potassium carbonate This is about 1.7 atomic weights of alkali metal cation for each molecular weight of alkaline earth metal carbonate. This is far in excess of the minimum amount of alkali metal salt required to form hard, dense granules, however the process works equally well and will offer homogeneity of the glass more rapidly in the glass furnace. The mixture is dried and crushed to form granules all of which pass through a 14 mesh Tyler test sieve and 92% of which are retained on a 150 mesh Tyler test sieve (0.104 millimeter opening). This product has a tapped bulk density of 84 pounds per cubic foot.

Example III (Differential Thermal Analysis of the Granular Product)

Freshly precipitated strontium carbonate crystals were filtered with washing to obtain a filter cake. This filter cake was admixed with 0.55 molecular weights of potassium carbonate per molecular weight of strontium carbonate; the admixture was dried and ground to a maximum particle size of about 1 millimeter. This granular material was compared with a commercially available unsintered spray dried strontium carbonate product produced by Chemical Products Corporation and sold for use as glass furnace feedstock under the tradename Strontium Carbonate, Type G. The two materials were compared by "Differential Thermal Analysis" their temperatures were raised at a rate of 10° C. per minute to 1400° C. The spray dried strontium carbonate sample displayed substantial endothermic activity centering around 925° C., 1100° C. and 1230° C; endothermic activity ceased at 1260° C. The product of the present invention prepared as described above herein displayed substantial endothermic activity at 870° C. and 1055° C.; endothermic activity ceased at 1150° C.

Without being limited by theory, it is generally accepted that the endothermic activity detected by differential thermal analysis represents heat absorbed during melting and decomposition to the oxide with carbon dioxide evolution.

Example IV (Comparison of Glass Batches)

Three laboratory batches of the following glass raw material formulation were prepared

| | |
|---|---|
| sand | 45.8 grams |
| sodium carbonate | 9.12 grams |
| potassium carbonate | 8.85 grams |
| strontium carbonate | 10.8 grams |
| barium carbonate | 1.97 grams |

In Batch A the barium carbonate and strontium carbonate were added as the commercially available sintered products produced by Chemical Products Corporation. In Batch G the barium carbonate and strontium carbonate were added as the commercially available spray dried products sold for feedstock for glass manufacture produced by Chemical Products Corporation. In Batch C the product of the present invention was prepared to incorporate all of the strontium carbonate, barium carbonate, and potassium carbonate into a single granular material (1.5 atomic weights of potassium for each molecular weight of alkaline earth metal carbonate).

These three glass batches were compared by thermal gravimetric analysis; the weight loss associated with decomposition of the carbonates to their oxides with evolution of carbon dioxide gas (which escapes) was measured continuously while portions of the samples were heated to 1200° C. at the rate of 15° C. per minute. The rate of weight loss had declined to zero for all three glass batches by the time they reached 1200° C. The following table shows the percentage of total weight loss (and therefore the percentage of the total carbon dioxide already evolved) at several temperatures:

| Percent of Total Weight Loss Occurring Upon Attainment of | Batch A | Batch B | Batch C |
|---|---|---|---|
| 900° C. | 38% | 72% | 88% |
| 1000° C. | 85% | 97% | 98% |
| 1100° C. | 97% | 99% | 100% |

The product of the present invention promoted the chemical reactions necessary for the formation of the glass; the carbon dioxide gas was evolved more rapidly.

EXAMPLE V (Manufacture of Glass Face Plates for Color TV Sets)

The following ingredients are intimately blended in the stated amounts to form a batch of glass furnace feed:

| Ingredient | Weight (kg) |
|---|---|
| Sand | 295 |
| Nephylene Syenite | 47 |
| Soda ash | 54 |
| Potassium carbonate | 61 |
| Sand | 295 |
| Strontium carbonate | 74 |
| Barium carbonate | 24 |
| Litharge | 9 |
| Ceric hydroxide | 0.8 |
| Antimony oxide | 1.1 |
| Titanium dioxide | 0.7 |
| Cullet (crushed glass) | 430 |

The blended batch of glass furnace feed is continuously introduced into the glass furnace at the controlled rate of 1/20 of the furnace's glass-holding capacity per hour. The melting zone of the furnace is held at 1350° C., the fining zone at 1450° C., and the conditioning zone at 1200° C. The molten glass flows out of the furnace and is formed into the shape of television face plates in stainless steel molds at about 1000° C.

The face plates are inspected for defects. Tiny defects, which show up as bright spots in the glass when the glass is illuminated, cause a face plate to be rejected and crushed up to be reintroduced to the glass furnace as cullet. When the strontium carbonate ingredient is the sintered product, Strontium Carbonate Type C, manufactured by Chemical Products Corporation, and the barium carbonate is the sintered product, Barium Carbonate Type CFF, also manufactured by Chemical Products Corporation, the 25-inch color TV face plates rejected because of "stones" (tiny undissolved pieces of raw material feedstock), "seeds" (tiny gas bubbles) and "cold glass defects" are approximately 15% of all these face plates molded. But when the strontium carbonate and barium carbonate ingredients are the granular product of Example I herein containing 0.8 atomic weights of potassium (0.4 molecular weights of potassium carbonate) for each gram molecular weight of alkaline earth metal carbonate, the face plates rejected are only about 7% of all those molded. This is a highly significant decrease, representing a substantial cost savings. Since the reject rate is reduced, the effective furnace production rate has been increased.

DESCRIPTION OF THE PREFERRED EMBODIMENTS

The most preferred embodiment of the present invention utilizes freshly precipitated barium carbonate and strontium carbonate crystals which have been dewatered to a 20 percent moisture to 60 percent moisture filter cake (depending upon the filtration equipment employed).

A large proportion of the alkali methyl salts which constitute raw materials for the glass batch (preferably sodium and potassium carbonates and nitrates) will be preferably admixed with the barium carbonate and strontium carbonate filter cakes to form either one product containing both barium and strontium carbonate or two separate products.

The admixture of barium carbonate or strontium carbonate filter cake and sodium carbonate and potassium carbonate (most preferably in the ratio of 1 molecular weight of sodium carbonate to 1 molecular weight of potassium carbonate) to yield a product containing about 2 atomic weights of alkali metal for each molecular weight of alkaline earth metal carbonate is most preferably dried by blending already-dried product with the pasty admixture to form a damp, crumbly mass, then drying this crumbly mass so as not to generate a substantial amount of particles of less than 0.1 millimeter diameter, for instance in a direct-fired rotary dryer. The dry product is preferably screened over a 14 mesh Tyler screen and the oversize crushed.

This invention has been explained so that it can be readily practiced by those skilled in the art. It should be clearly understood that, having the benefit of this disclosure, those skilled in the art will be able to practice this invention otherwise than has been specifically described and exemplified herein.

We claim:

1. A method of manufacturing dense, granular alkaline earth metal carbonate materials for use as glass furnace raw materials comprising a. admixing a fine particle size form of one or more alkaline earth metal carbonates where (substantially all particles are smaller than about 0.1 millimeter equivalent spherical diameter with at least 5 weight percent water, b. adding one or more alkali metal compounds to the admixture in an amount sufficient to provide at least about 0.2 gram atomic weight of alkali metal for each gram molecular weight of alkaline earth metal carbonate present, c. mixing the admixture for a time sufficient to allow at least a portion of the alkali metal salts to dissolve in the water that is present, d. drying the resultant mixture to produce granules, and e. classifying the dried mixture and grinding if necessary to insure that most of the granules are between about 0.1 millimeter and about 1.0 millimeter in size.

2. The method of claim 1 wherein, in step (a) the alkaline earth metal carbonate is strontium carbonate.

3. The method of claim 1 wherein, in step (a) the alkaline earth metal carbonate is barium carbonate.

4. The method of claim 1 wherein, in step (a) the alkaline earth metal carbonates are a mixture of strontium and barium carbonates.

5. The method of claim 1 wherein, in step (a) the alkaline earth metal carbonates are a mixture of strontium, barium and calcium carbonates.

6. The method of claim 1 wherein, in step (b) the alkali metal compounds are sodium and potassium carbonate.

7. The method of claim 1 wherein sufficient alkali metal compounds are added so as to provide about 1 gram atomic weight of alkali metal for each gram molecular weight of alkaline earth metal carbonate present.

8. The method of claim 1 wherein, in step (b), a portion of the alkali metal compounds are sodium and potassium salts of organic macromolecular anions.

9. A method of manufacturing dense, granular alkaline earth metal carbonate materials for use as glass furnace feedstock comprising:

a. precipitating barium and/or strontium carbonate crystals from a barium and/or strontium ion containing solution, b. filtering and washing the barium and/or strontium carbonate precipitate to produce a filter cake, c. adding one or more alkali metal compounds to the berium and/or strontium carbonate filter cake in an amount sufficient to provide at least about 0.2 gram atomic weight of alkali metal for each gram molecular weight of alkaline earth metal carbonate present, d. mixing the admixture for a time sufficient to achieve homogeneity and allow at least a portion of the alkali metal compounds to dissolve in residual water that is present in the cake, e. mixing the wet admixture of step (d) with an amount of the same material that has already been dried to form a crumbly, damp, less sticky mass, f. drying the crumbly, damp admixture, and g. crushing the dried admixture which contains oversized granules to insure that all granules are smaller than about 1.0 millimeter in size.

10. The method of claim 9 wherein, in step (c), the alkali metal compounds are a mixture of sodium carbonate and potassium carbonate.

11. The method of claim 9 wherein, in step (c), the alkali metal compound is potassium carbonate.

12. The method of claim 9 wherein, in step (c), the alkali metal compound is sodium silicate.

13. The method of claim 9 wherein, in step (c), the alkali metal compound is sodium carbonate.

14. The method of claim 9 wherein, in step (c), the alkali metal compounds are one or more of sodium, potassium, or lithium citrate, polyacrylate, phosphate, nitrate or carbonate.

15. A method of manufacturing dense, granular alkaline earth metal carbonate materials for use as glass furnace raw materials that improve the performance of the glass furnace comprising a. admixing a fine particle size form of one or more alkaline earth metal carbonates with one or more alkali metal compounds in aqueous solution form a plastic mass containing at least 0.2 atomic weight of alkali metal for each molecular weight of alkaline earth metal carbonate, b. mixing for a time sufficient to achieve homogeneity;

c. drying the resultant mixture under conditions such that the bulk of the product does not reach a temperature over about 700° C., d. grinding any large particles to achieve a product with a maximum particle size of about 1 millimeter.

16. The method of claim 15 wherein, in step (a), strontium carbonate is admixed with sodium carbonate or potassium carbonate such that one atomic weight of alkali metal is present for each molecular weight of strontium carbonate.

17. The method of claim 15 wherein, in step (a), barium carbonate is admixed with potassium carbonate.

18. The method of claim 15 wherein, in step (a), calcium carbonate is admixed with sodium carbonate or potassium carbonate such that two atomic weights of alkali metal are present for each molecular weight of calcium carbonate.

19. The method of claim 15 wherein, in step (a), strontium carbonate, barium carbonate, and calcium carbonate are admixed with sodium carbonate, potassium carbonate, and potassium nitrate in the proportions required to introduce all of the above required for a particular glass formulation into the glass batch as one granular product.

20. The method of claim 15 wherein, in step (a), a portion of the alkali metal compounds are made up of the sodium and potassium salts of organic acids.

* * * * *